(12) United States Patent
Fomby, Jr. et al.

(10) Patent No.: US 8,774,634 B2
(45) Date of Patent: Jul. 8, 2014

(54) METHODS, SYSTEMS, AND DEVICES FOR WIRELESSLY STREAMING DATA TO AN OPTICAL DISC

(75) Inventors: Franklin Thomas Fomby, Jr., Atlanta, GA (US); Don Swanner Wrenn, Dunwoody, GA (US); Crista Catherine Wrenn, Dunwoody, GA (US)

(73) Assignee: Don Swanner Wrenn, Brandon, MS (US)

( * ) Notice: Subject to any disclaimer, the term of this patent is extended or adjusted under 35 U.S.C. 154(b) by 71 days.

(21) Appl. No.: 13/423,206

(22) Filed: Mar. 17, 2012

(65) Prior Publication Data
US 2013/0064548 A1 Mar. 14, 2013

Related U.S. Application Data

(60) Provisional application No. 61/454,210, filed on Mar. 18, 2011.

(51) Int. Cl.
*H04B 10/00* (2013.01)
(52) U.S. Cl.
USPC ............................. 398/116; 398/128; 398/135
(58) Field of Classification Search
USPC .......... 398/115, 116, 128, 135, 138; 369/52.1
See application file for complete search history.

(56) References Cited

U.S. PATENT DOCUMENTS

| | | | |
|---|---|---|---|
| 5,652,838 A | 7/1997 | Lovett et al. | |
| 5,790,489 A | 8/1998 | O'Connor | |
| 6,044,046 A | 3/2000 | Diezmann et al. | |
| 6,359,842 B1 | 3/2002 | Taguchi et al. | |
| 6,980,351 B2 | 12/2005 | Ahn et al. | |
| 7,057,979 B2 | 6/2006 | Hata | |
| 7,117,021 B2 | 10/2006 | Shearer et al. | |
| 7,430,154 B2 | 9/2008 | Pratt et al. | |
| 7,456,968 B2 | 11/2008 | Potyrailo et al. | |
| 7,623,895 B1 | 11/2009 | Suber, III | |
| 7,710,852 B2 | 5/2010 | Oshima et al. | |
| 7,801,484 B2 | 9/2010 | Hughes et al. | |
| 7,830,770 B1 | 11/2010 | Linnell | |
| 8,081,541 B2 | 12/2011 | Dokai et al. | |
| 8,233,803 B2 * | 7/2012 | Meyer et al. | 398/106 |

(Continued)

FOREIGN PATENT DOCUMENTS

KR 20070097881 10/2007

OTHER PUBLICATIONS

Arrington, Victor; "Samsung's New Optical Smart Hub Wirelessly Streams DVDs—Inside Samsung," located at http://www.insidesamsung.com/2012/01/09/samsungs-new-optical-smart-hub-wirelessly-streams-dvds; acccessed Feb. 21, 2012; 1 pg.

(Continued)

*Primary Examiner* — Dalzid Singh
(74) *Attorney, Agent, or Firm* — Taylor English Duma LLP

(57) ABSTRACT

Provided are devices, systems, and methods for wirelessly streaming digital data to an optical disc. Embodiments of the device are designed to enable real time, wireless streaming of data via wireless communication. A user can wirelessly stream data from an electronic device capable of wireless communication, to an optical disc containing a memory, a power supply, a processor, a transceiver, a charging device, and an optical modulator. An optical disc reader can then read the electronic data on the optical disc to process the electronic data in real time.

19 Claims, 6 Drawing Sheets

(56) References Cited

U.S. PATENT DOCUMENTS

| | | | | |
|---|---|---|---|---|
| 8,344,874 B2* | 1/2013 | Fadell | | 340/538 |
| 2005/0240958 A1 | 10/2005 | Nguyen et al. | | |
| 2006/0206910 A1 | 9/2006 | Kozenitzky et al. | | |
| 2007/0013601 A1 | 1/2007 | Atkinson et al. | | |
| 2007/0030781 A1 | 2/2007 | Benedikt | | |
| 2007/0194945 A1 | 8/2007 | Atkinson | | |
| 2008/0009270 A1 | 1/2008 | Volk et al. | | |
| 2010/0014868 A1* | 1/2010 | McGlynn et al. | | 398/115 |
| 2011/0002209 A1 | 1/2011 | Kirovski et al. | | |
| 2011/0103214 A1 | 5/2011 | Yamaoka et al. | | |

OTHER PUBLICATIONS

French, Robert; "The Smart Samsung Optical Hub_Techour"; located at http://www.techour.com/gadgetsmore/televisions/the-smart-samsung-optical-hub; accessed on Feb. 21, 2012; 3 pgs.

Wu et al; "Optimal Transmission of High Definition Video Tramission in WiMedia Systems"; located on Wirless Networks Online 2011, vol. 17, Issue 2, pp. 291-303; 13 pgs.

Breed, Gary; "A Tutorial Introduction to Optical Modulation Techniques"; from High Frequency Electronics, May 2007. Summit Technical Meia, LLC; 2 pgs.

Perenson, Melissa, J.; "Samsung's New Optical Smart Hub Wirelessly Streams DVDs"; Located at www.pcworld.com/article/247505/samsungs_new_optical_smart_hub_wirelessly_streams; accessed Jan. 9, 2012; 3 pgs.

Article Entitled: "Samsung's New Optical Smart Hub Wirelessly Streams of DVDs"; located at www.mobile89.info/samsungs-new-optical-smart-hub-wirelessly-streams-dvds; accessed on Jan. 9, 2012; 3 pgs.

* cited by examiner

METHODS, SYSTEMS, AND DEVICES FOR WIRELESSLY STREAMING DATA TO AN OPTICAL DISC

CROSS-REFERENCE

This application claims the benefit of U.S. Provisional Application No. 61/454,210, filed Mar. 18, 2011, the entire disclosure of which is hereby incorporated by reference herein.

TECHNICAL FIELD

The present disclosure generally relates to data streaming, and more particularly relates to systems and methods for wirelessly streaming data between devices.

BACKGROUND

Movies, documents, music, software and other types of data are stored on optical discs. Compact Discs (CDs) and DVDs are two of the most common types of optical discs. Both consist of an injection-molded piece of clear polycarbonate plastic that is made into a circular shape. The plastic is imprinted with microscopic bumps ("pits") arranged as a single, continuous, long spiral track of data. A thin, reflective layer covers these pits and the area between each pit known as the "lands". A laser beam in the disc player is directed to the reflective data track on the optical disc. Contrary to what one might expect, the bumps and intervening reflective lands on the CD/DVD surface do not directly designate 1's and 0'. Rather, each bump edge, whether leading or trailing, is a 1 and all areas in between, whether bumps or lands, are 0's. The edge between the bumps and lands creates destructive interference within the laser beam therein reducing the intensity of the reflected light. The differences in intensity of the light is then read by an optical reader and converted into digital form. While this method is successful at storing and retrieving data there is a need for the ability to wirelessly stream data in digital form to the disc that can then be delivered to the optical reader. Rewritable optical discs, such as rewritable CDs and DVDs, allow a user to change the contents of the disc, however this process takes time, requires additional equipment, and can only be done for a limited number of times before the discs are no longer usable. While this type of rewriting is successful, there is a need for faster data writing that can be repeated many more times without rendering the disc unusable.

SUMMARY

Optical discs can be used for data storage. Provided are methods, systems, and devices that allow a user to wirelessly and quickly update data on an optical disc without special equipment.

By combining memory, a power supply, a processor, a transceiver, a charging device, and an optical modulator on an optical disc and covering it with a reflective layer, the resulting disc is a highly changeable, self contained and durable device. The combination of these components results in an optical disc that is capable of being updated in real time via wireless communication. Additional embodiments can omit components according to the desired use of the device. For example, in applications where an optical disc will only be used once, the charging device can be omitted to decrease costs and lower the device's weight. Additionally, in some applications the transceiver and processor can be combined into one component to decrease costs and lower the device's weight.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods, systems, and devices.

DETAILED DESCRIPTION

Figure 1:
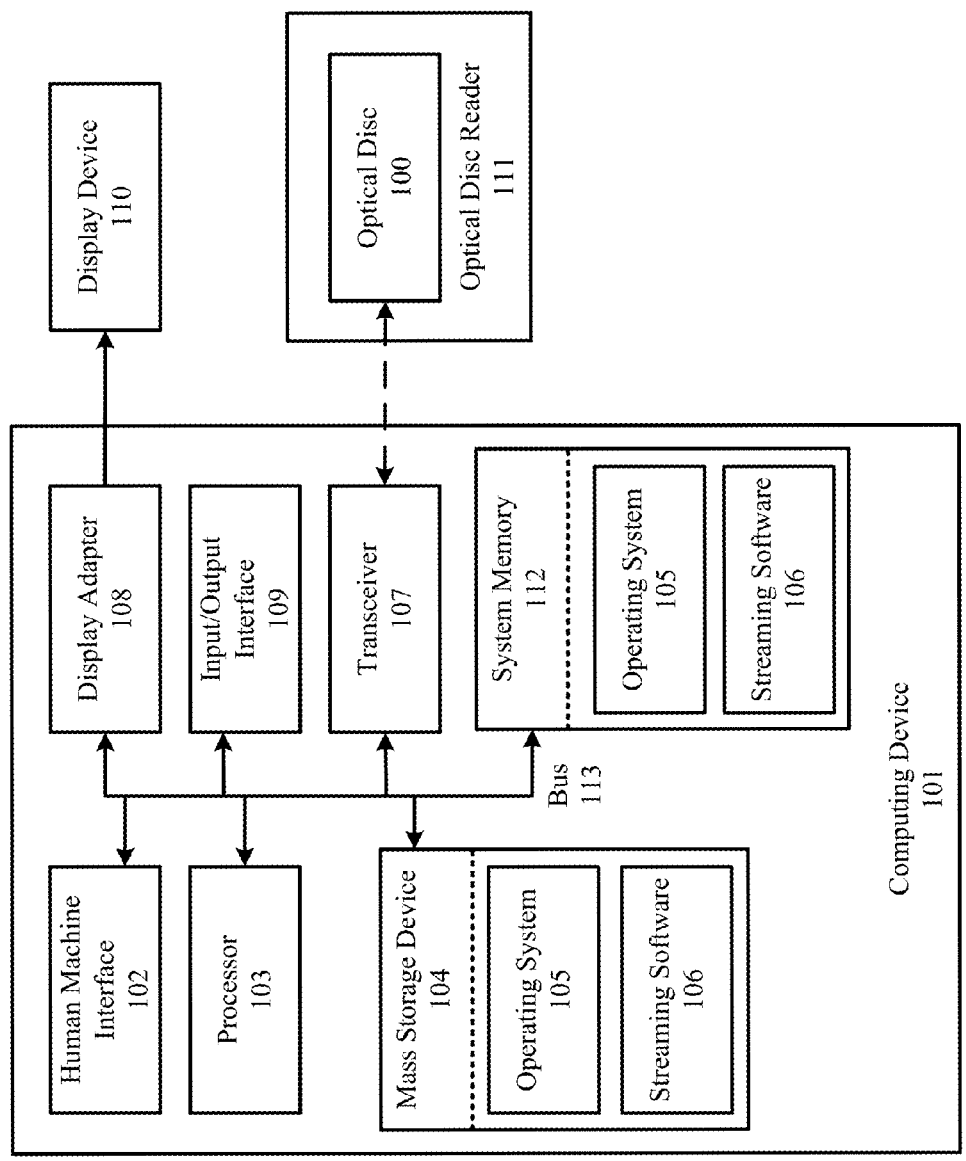
FIG. 1 is exemplary diagram of a system for wirelessly streaming data from a computing device to an optical disc.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized.

Embodiments of the methods and systems are described below with reference to block diagrams and flowchart illustrations of methods, systems, apparatuses and computer program products. It will be understood that in certain aspects, one or more blocks of block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, in an aspect, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2A:
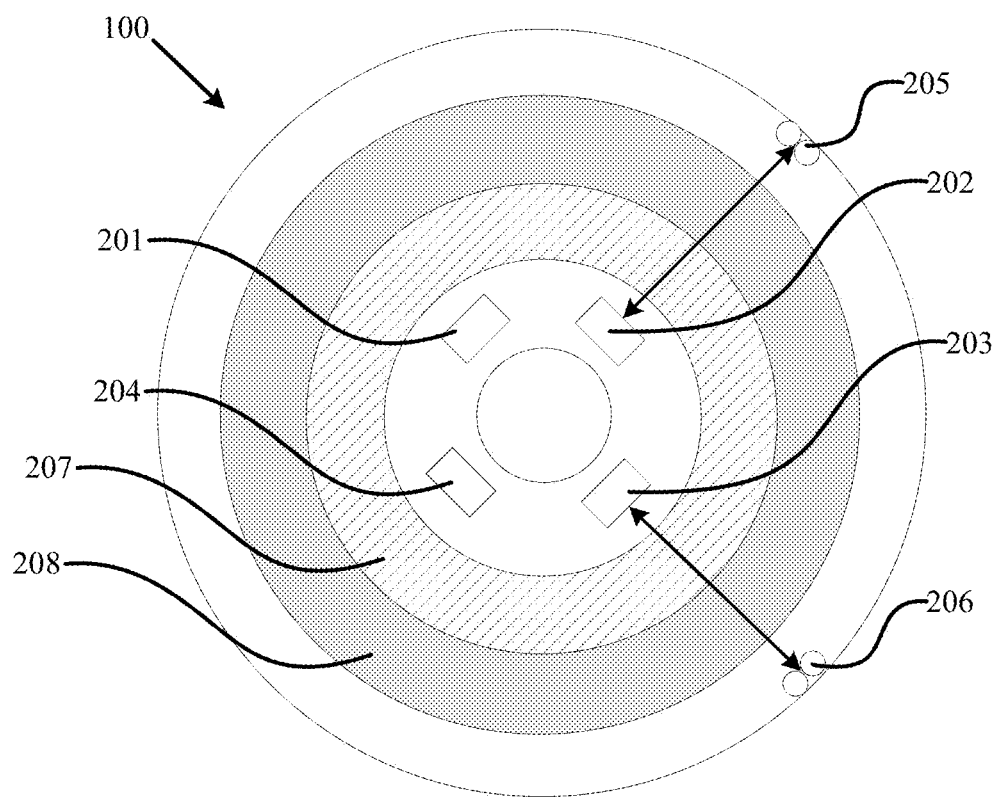
FIGS. 2a and 2b are exemplary embodiments of an optical disc for wirelessly streaming data.
Figure 2B:
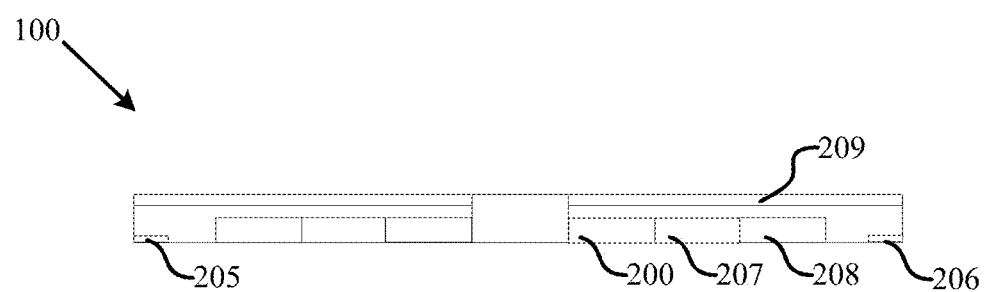

One skilled in the art will appreciate that provided herein is a functional description and that the respective functions can be performed by software, hardware, or a combination of software and hardware. For example, Streaming Software 106 as illustrated in FIG. 1 and described below, is software that comprises programming to interact with different hardware components. In one exemplary aspect, the methods, systems, and media can comprise a computing device 101 as illustrated in FIG. 1 and described below. In another exemplary aspect, the units can comprise an optical disc 100 as illustrated in FIGS. 2a and 2b, described below.

FIG. 1 is an exemplary diagram of a system for wirelessly streaming data from a computing device to an Optical Disc 100 and contains a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, kiosks, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 101. In one embodiment, computing device 101 can be a digital music player (e.g., iPod®), personal digital assistant, tablet, or personal computer ("PC"). The components of the computing device 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including processor 103, mass storage device 104, operating system 105, streaming software 106, transceiver 107, system memory 112, Input/Output Interface 109, display adapter 108, display device 110 and human machine interface 102, can be contained within one or more remote computing devices (not shown) at physically separate locations, connected through buses of this form, in effect implementing a fully distributed system.

The computing device 101 typically comprises a variety of computer readable media. Exemplary readable media can be any available media that is accessible by the computing device 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains temporary data such as streaming data (not shown) and/or program modules such as operating system 105 and streaming software 106 that are immediately accessible to and/or are presently operated on by the processing unit 103.

In another aspect, the computing device 101 can also comprise other removable/non-removable, volatile/non-volatile computer storage media. By way of example, FIG. 1 illustrates a mass storage device 104 which can provide nonvolatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and streaming software 106. Each of the operating system 105 and streaming software 106 (or some combination thereof) can comprise elements of the programming and the streaming software 106. Streaming data can also be stored on the mass storage device 104, in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 101 via an input device (not shown). Examples of such input devices comprise, but are not limited to, a keyboard, pointing device (i.e., a "mouse"), a microphone, a joystick, a scanner, touch screen, tactile input devices such as gloves, and other body coverings, and the like. These and other input devices can be connected to the processing unit 103 via a human machine interface 102 that is coupled to the system bus 113, but can be connected by other interface and bus structures, such as a parallel port, a game port, an IEEE 1394 Port ("Firewire" port), a serial port, or a universal serial bus (USB).

In yet another aspect, a display device 110 can also be connected to the system bus 113 via an interface, such as a display adapter 108. It is contemplated that the computing device 101 can have more than one display adapter 108 and the computing device 101 can have more than one display device 110. For example, a display device can be a monitor, an LCD (Liquid Crystal Display), or a video projector. In another exemplary embodiment, display device 110 can be a touch sensitive screen. In addition to the display device 110, other output peripheral devices can comprise components such as speakers (not shown) and a printer (not shown) which can be connected to the computing device 101 via Input/Output Interface 109. Any step and/or result of the methods can be output in any form to an output device. Such output can be any representation, including, but not limited to, textual, graphical, animation, audio, tactile, and the like.

The computing device 101 can operate in a networked environment using logical connections to one or more remote optical discs 100. By way of example, a remote optical disc can be any optical disc configured to receive a signal and transform the signal into data to be read by an optical disc reader 111. Optical disc reader 111 can be a Compact Disc (CD) reader, a DVD reader, a Blu-ray reader, or any reader capable of reading a disc with binary data encoded in the form of pits (binary value of 0 or off, due to lack of reflection when read) and lands (binary value of 1 or on, due to a reflection when read).

Logical connections between the computing device 101 and a remote optical disc 100 can be made via a local area network (LAN) and a general wide area network (WAN). Such network connections can occur through a transceiver 107, capable of sending and receiving data to one or more computing devices 101. Transceiver 107 can be implemented in both wired and wireless environments and is capable of utilizing various wireless communications technologies in different embodiments including, for example, 3G/4G cellular, Wi-Fi (IEEE 802.11), ZigBee, Bluetooth, WiMAX, and the like. In another aspect, transceiver 107 can simultaneously receive data from and transmit data to more than one computing device 101.

In one aspect, an Optical Disc 100 (described below, FIGS. 2a and 2b) can comprise a wireless receiver, capable of receiving a signal from transceiver 107. Optical Disc 100 is also capable of utilizing various wireless communications technologies in different embodiments including, for example, 3G/4G cellular, Wi-Fi (IEEE 802.11n), ZigBee, Bluetooth, WiMAX, etc. Optical disc reader 111 is capable of reading and processing data from Optical Disc 100.

For purposes of illustration, application programs and other executable program components such as the operating system 105 are illustrated herein as discrete blocks, although it is recognized that such programs and components reside at various times in different storage components of the computing device 101, and are executed by the data processor(s) 103 of the computer. An implementation of streaming software 106 can be stored on or transmitted across some form of computer readable media, such as mass storage device 104. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As illustrated in further detail in FIGS. 2a and 2b, one embodiment of the optical disc 100 comprises components that operate together to form a device capable of wirelessly receiving a data stream and transforming the data stream so that an optical disc reader can process the data. Each component is affixed to optical disc 100 and sealed beneath a reflective layer (FIG. 2b, 209). The reflective layer can comprise aluminum, gold, or any other acceptable material.

In one aspect, optical disc 100 includes a memory 201 which can comprise memory types such as flash memory cards, magnetic strips, random access memories (RAM), read only memories (ROM), electrically erasable programmable read-only memory (EEPROM), dynamic random-access memory (DRAM), and/or static random-access memory (SRAM). Memory 201 can be powered by power supply 202 and can be configured to store data from processor 203 or transceiver 204.

Optical disc 100 may also include a power supply 202 capable of providing power for each component. Power supply 202 can be a rechargeable battery or any other power source sufficient to power each component of optical disc 100. Power supply 202 is configured to supply power to each component of optical disc 100 and when not in use, may be recharged via external power connection point 205. Power supply 202 can be coupled to photosensitive charging array 207 which is capable of recharging the power supply via a photovoltaic effect. In another aspect, power supply 202 can be coupled to a kinetic charger (not shown) which is capable of recharging the power supply by kinetic motion. Generally, a kinetic charger can be configured to convert the kinetic energy from the optical disc's circular motion. In this aspect, the kinetic charger can convert the circular motion of the optical disc into electricity by transforming the energy from the circular motion into energy to be used by the disc to do a physical work. The physical work can be used to actuate an electrical generator that is part of the kinetic charger. The electrical generator can convert the physical work into direct or alternating current. The current can then be used to power one or more of the components on the optical disc 100.

Optical disc 100 may also include a processor 203 that can be configured to playback any data stored in the memory 201. Processor 203 is coupled to optical modulator 208 which is configured to create a modulated light beam and impart a digital signal to a photodiode located in the Optical Disc Reader 111 (described below, FIGS. 3a and 3b). Processor 203 can control transceiver 204 in order to communicate with computing device 101 to identify communication protocols.

Additionally, processor 203 may be programmed via electrical input/output circuit 206. Electrical input/output circuit 206 can be an electrical lead, capable of transferring data by way of communication protocols. Examples of such communication protocols include, but are not limited to, USB2.0, USB3.0, RS-232, RS-485, and IEEE 802.3.

Optical disc 100 may also include a transceiver 204 that can communicate wirelessly with computing device 101. Transceiver 204 can utilize different communication protocols to send and receive data to computing device 101. The communication protocols can include, for example, 3G/4G cellular, Wi-Fi (IEEE 802.11n), ZigBee, Bluetooth, WiMAX, and other wireless technologies as known in the art. Transceiver 204 is capable of storing received data in memory 201, is also powered by power supply 202, and is controlled by processor 203.

Figure 3A:
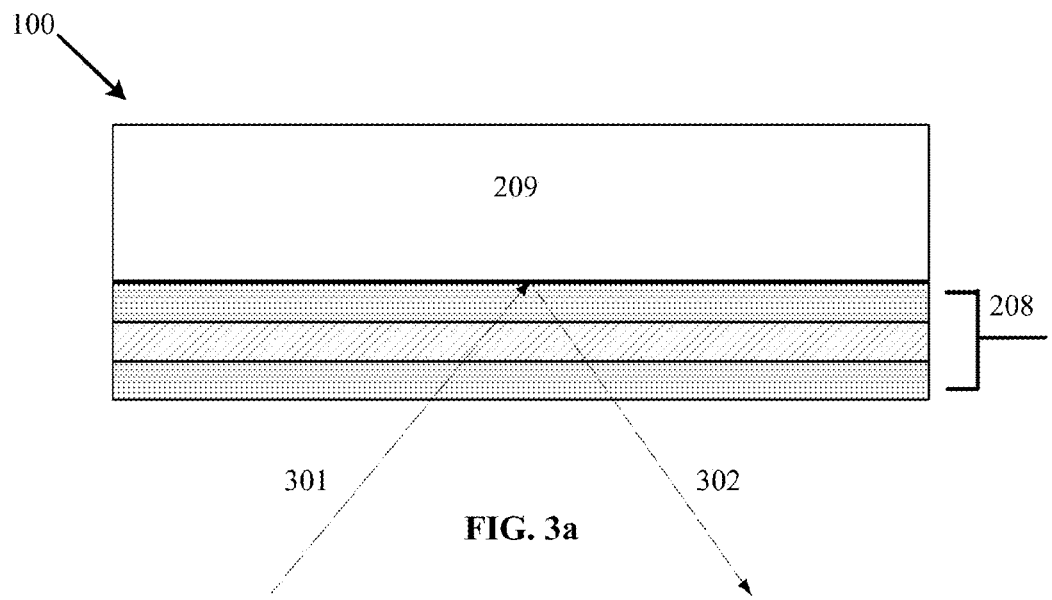
FIGS. 3a and 3b are exemplary diagrams showing simulation of "pits" and "lands" with an optical modulator.
Figure 3B:
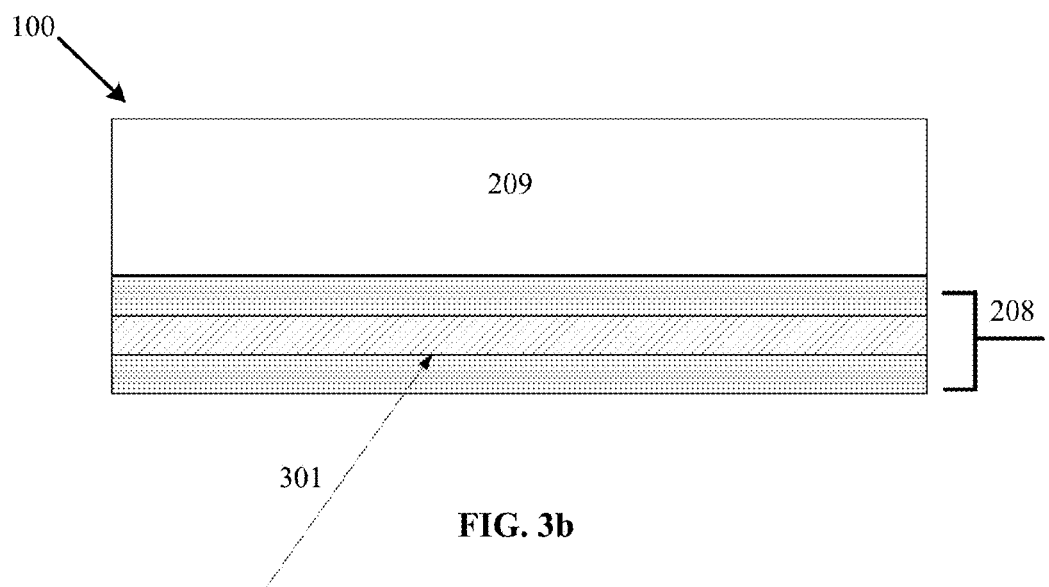
Figure 4:
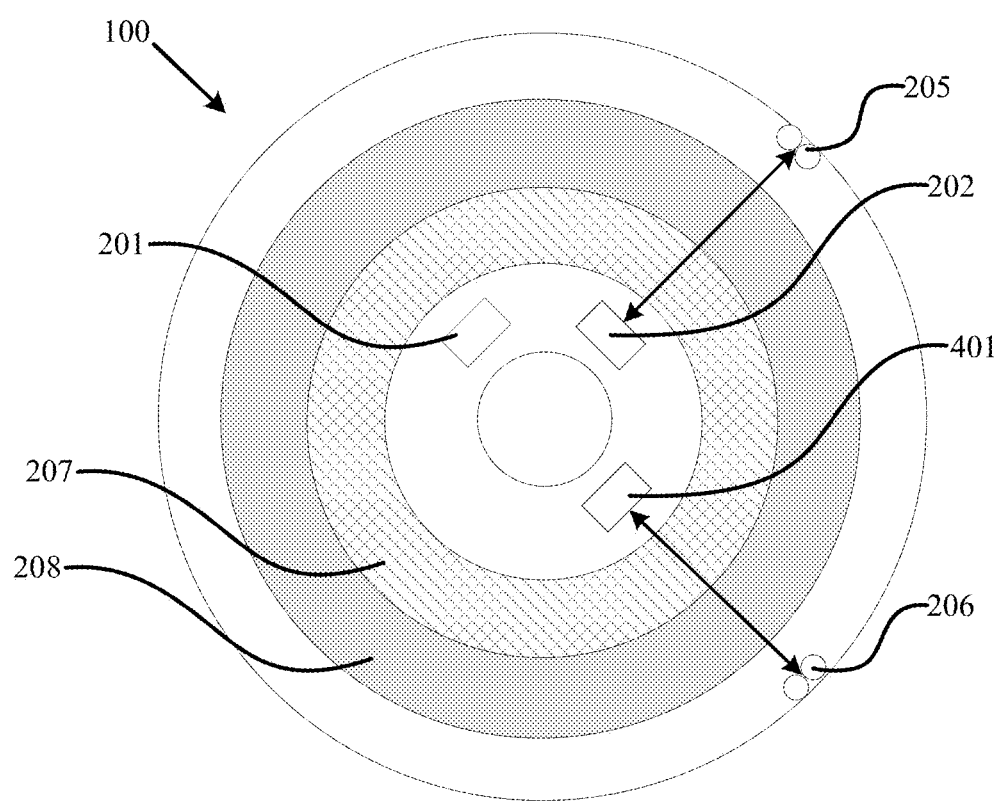
FIG. 4 is an exemplary embodiment of an optical disc for wirelessly streaming data utilizing a combined transceiver and processor.

FIG. 4 shows an alternative embodiment of the optical disc 100. In this embodiment, the processor 203 and the transceiver 204 from FIG. 2 have been replaced by a single processor combined with a transceiver 401. This new processor 401 is coupled to optical modulator 208 which is configured to create a modulated light beam and impart a digital signal to a photodiode located in the Optical Disc Reader 111 (described below, FIGS. 3a and 3b). Processor 401 contains a transceiver capable of communicating with computing device 101 to identify communication protocols. Additionally, processor 401 may be programmed via electrical input/output circuit 206. Electrical input/output circuit 206 can be an electrical lead, capable of transferring data by way of communication protocols. Examples of such communication protocols include, but are not limited to, USB2.0, USB3.0, RS-232, RS-485, and IEEE 802.3.

Traditionally, data can be stored on CDs and DVDs as a series of indentations known as "pits," encoded in a spiral track molded into the top of a polycarbonate layer. The areas between pits are known as "lands." CD and DVD readers use a laser to "read" reflected light, or absence of reflected light, from the pits and lands. The CD and DVD readers then convert the reflected light, or absence of reflected light, into binary data. In one embodiment, optical disc 100 can utilize an optical modulator 208 to simulate the pits and lands on-demand. The simulated changes in the pits and lands occur when processor 203 receives data from transceiver 204 or memory 201 and sends a corresponding instruction to optical modulator 208 to simulate altered pits and lands as needed. A photodiode in the Optical Disc Reader 111 then reads the modulated light beam, identifies when the light beam is present and when the light beam is not present, and converts this information into electronic data.

As illustrated in further detail in FIGS. 3a and 3b, one embodiment of the optical disc 100 includes optical modulator 208 which can be used to simulate bumps and lands. FIG. 3a is an exemplary illustration of indirect modulation where optical modulator 208 is simulating a bump by allowing emitted laser light 301 to pass through optical modulator 208, and reflect back off of reflective layer 209. Reflected laser light 302 then passes through optical modulator 208 and is then received by optical disc reader 111. Optical disc reader 111 can then interpret the received reflected laser light 302 and transform the light into an electronic signal. FIG. 3b is an exemplary illustration of indirect modulation where optical modulator 208 is simulating a land by not allowing emitted laser light 301 to pass through optical modulator 208, to reflect back off of reflective layer 209. Thus, no reflected laser light passes through optical modulator to be received by optical disc reader 111. Optical disc reader 111 can then interpret the absence of received reflected laser light and transform this absence of reflected laser light into an electronic signal.

Figure 5A:
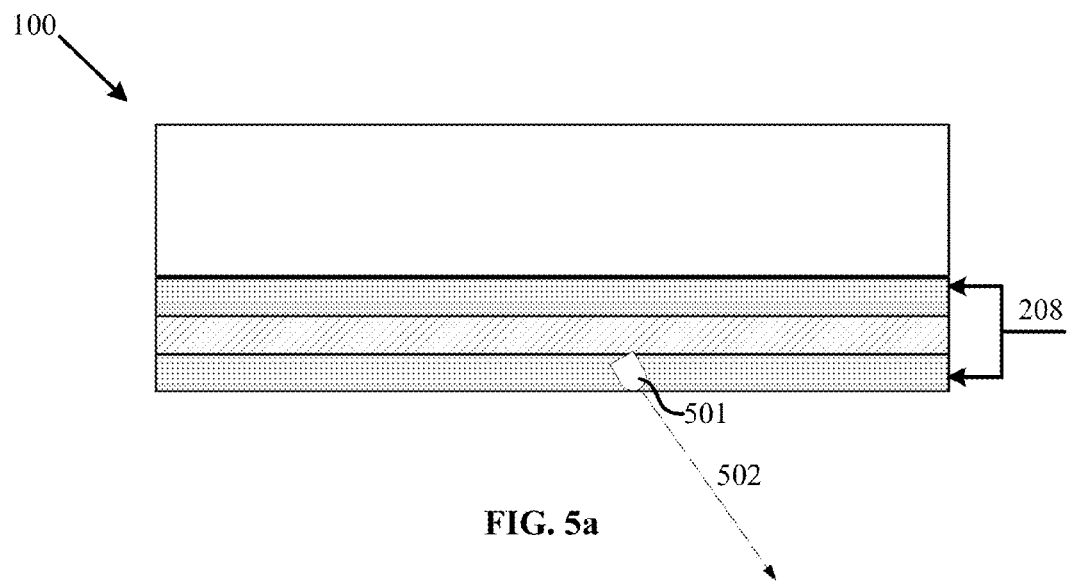
FIGS. 5a and 5b are exemplary diagrams showing simulation of "pits" and "lands" by direct modulation of a light a source.
Figure 5B:
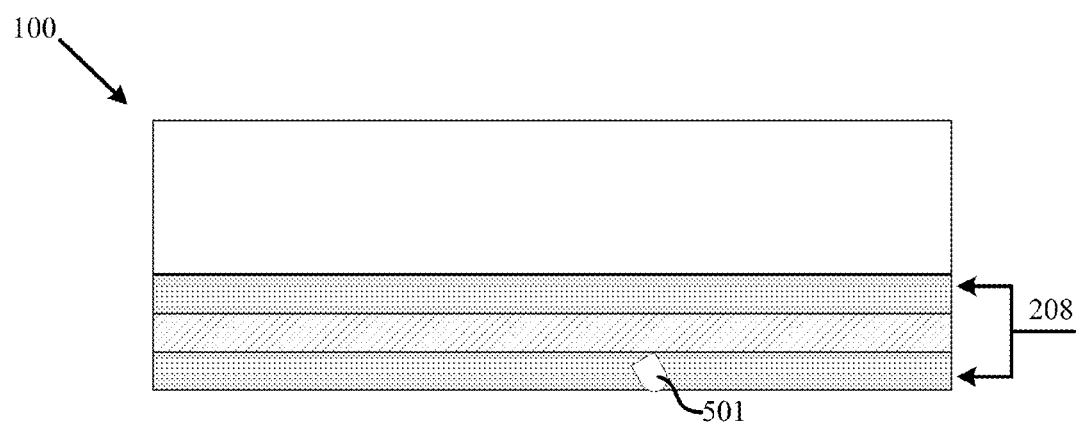

FIGS. 5a and 5b are an exemplary illustration of an embodiment where the optical disc 100 is capable of direct modulation to simulate bumps and lands. In this embodiment, optical disc 100 includes a light source 501. The light source 501 can be a part of the optical modulator 208 and can be powered by the power supply 202. One example light source can be a light-emitting diode (LED). The light source 501 can simulate a pit by sending a direct light wave 502 to the optical disc reader 111. Optical disc reader 111 can then interpret the direct light wave 502 and transform the light into an electronic signal. FIG. 5b is an exemplary illustration of the light source 501 simulating a land by not sending a light wave to the optical disc reader 111. Thus, no light wave is passed to the optical disc reader 111. Optical disc reader 111 can then interpret the absence of received light and transform this absence of light into an electronic signal.

Figure 6:
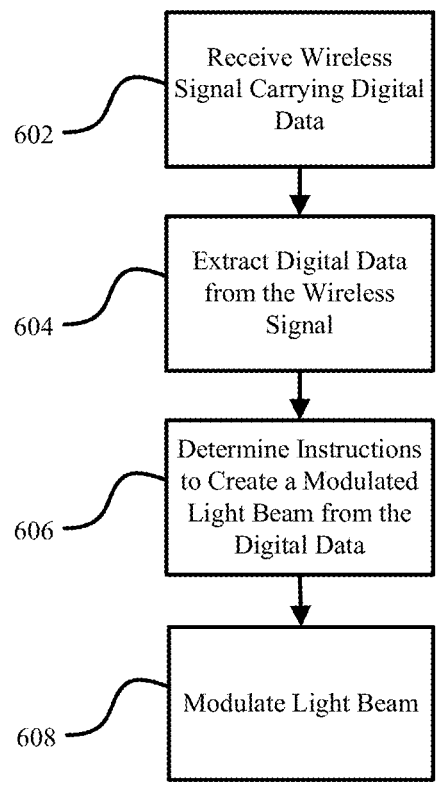
FIG. 6 is an exemplary flow diagram for wirelessly streaming data to an optical disc.

In one embodiment of the present disclosure for wirelessly streaming data to an optical device, the optical device receives a wireless signal to be processed to emulate pits and lands. FIG. 6 is an exemplary flowchart of a method for using an optical disc to wirelessly stream data. In 602 a transceiver 107 of optical disc 100 receives a wireless signal carrying digital data from a wireless device. For example, the transceiver can receive a Bluetooth signal from a user's handheld media player. Next, in 604 the transceiver 107 provides digital data extracted from the wireless signal to a processor 103 that is embedded in the optical disc 100. Using the same example, the transceiver provides the Bluetooth signal extracted from the user's handheld media player's Bluetooth signal to a processor embedded in the optical disc 100. Next, in 606 the processor 103 determines instructions of whether to create a modulated light beam in accordance with the digital data and instructs an optical modulator 208 that is embedded in the optical medium. Continuing with the same example, the processor 103 analyzes the Bluetooth signal to determine whether the optical modulator 208 should emulate a pit or a land of a conventional CD or DVD. The processor then instructs the optical modulator to emulate a pit or a land. Finally, in 608 the optical modulator 208 emulates a pit or a land by modulating a light beam according to the instructions from processor 103. With this example, an LED light can be used to emulate a pit or a land by acting as an optical modulater and providing a beam of light when instructed by the processor. The user's media reading device, (DVD player, car stereo, etc. . . . ) can then interpret the signal and process it accordingly to play the user's wirelessly transmitted media.

In an exemplary embodiment, an optical disc 100 can be used where a user wishes to wirelessly transmit music, via Bluetooth, from a computing device 101, such as a digital music player (i.e., IPOD), personal digital assistant, tablet, or personal computer (PC) to an optical disc reader 111. In this exemplary embodiment, the optical disc reader 111 can be a car or home stereo CD/DVD player. Here, the disc's transceiver 204 sends a signal to the computing device's transceiver 107 to indicate that the optical disc 100 is available for data to be streamed. The user may then select the optical disc 100 for streaming via the human machine interface 102 on the computing device 101. The computing device 101 can then use streaming software 106 to begin wirelessly streaming data to the optical disc 100 in the user's optical disc reader 111.

In another exemplary embodiment, an optical disc 100 can be used in media rental kiosks. Such kiosks include movie, music, and video game rental kiosks. When the user makes one or more selections at the kiosk, the data can be streamed from the kiosk (serving as computing device 101) to the optical disc 100 via transceiver 204 or electrical input/output circuit 206 and stored in memory 201. The optical disc 100 can then be given to the user for them to use in their personal optical disc reader 111. This exemplary embodiment allows the kiosk owner to constantly update the media on the optical discs remotely, without needing to change the physical discs themselves.

This exemplary embodiment can be used to store one or more media selections by utilizing high density memory such as flash memory and the like. For example, and not meant to be limiting, an optical disc 100 utilizing 32 GB of Secure Digital High Capacity (SDHC) flash memory can store the equivalent amount of data of six single-sided single-layer DVDs. In this embodiment, multiple SDHC flash memory cards can be used to store larger amounts of data. The Secure Digital Extended Capacity (SDXC) flash memory cards can also be used to store large amounts of data.

In another aspect, the optical disc 100 can store an advertisement in memory 201 when the user selects one or more selections at the media kiosk. The media kiosk can add an advertisement designed to target the specific user by utilizing the user's location, purchase selections, Wirelessly receiving digital data can comprise receiving, by a transceiver embedded in an optical medium, a wireless signal carrying digital data, providing, by the transceiver, digital data extracted from the wireless signal to a processor embedded in the optical medium, providing, by the processor, instructions to create a modulated light beam in accordance with the digital data to an optical modulator embedded in the optical medium, and modulating, by the optical modulator, the light beam to emulate pits and lands.

In another embodiment, wirelessly receiving digital data can comprise automatically detecting the presence of an external device in a receiving range of the transceiver, wherein the wireless signal carrying digital data is received from the external device. Additionally, wirelessly receiving digital data can comprise automatically detecting wireless communication initiated by the external device. An external device can be any device capable of wirelessly transmitting digital data. Examples of an external devices include, but are not limited to, an Apple iPhone®, an Apple iPod®, a Microsoft Zune®, a Sony Walkman®, an Archos® 9 PC Tablet or any other external device capable of using wireless protocols to stream data. Examples of wireless communication include, but are not limited to, 3G/4G cellular, Wi-Fi (IEEE 802.11n), ZigBee, Bluetooth, WiMAX, etc.

An optically readable medium can comprise a processor, a transceiver, coupled to the processor, configured for communicating with an external device, a memory, coupled to the processor, configured for storing a signal received from the transceiver, and an optical modulator, coupled to the processor, configured to receive instructions from the processor to arrange a modulated light beam based on the signal stored in the memory. Additionally, an optically readable medium can further comprise a power supply, and a charging device, such as a photo sensitive array.

In another embodiment, an optically readable medium can further comprise an optical modulator configured to create a modulated light beam in real time to simulate pits and lands on demand in response to instructions received from the processor.

In another embodiment, an optically readable medium can further comprise a transceiver configured to automatically detect a presence of the external device in a receiving range of the transceiver.

In another embodiment, an optically readable medium can further comprise a transceiver is configured to automatically detect wireless communication initiated by the external device.

A system for wirelessly streaming data can comprise an optically readable medium, comprising, a processor, a transceiver, coupled to the processor, configured for communicating with an external device, a memory, coupled to the processor, configured for storing a signal received from the transceiver, and an optical modulator, coupled to the processor, configured to receive instructions from the processor to create a modulated light beam based on the signal stored in the memory; and an optical reader, comprising, a reading laser configured to emit laser light to the optically readable medium, and an opto-electronic device configured for sensing laser light reflected from the optically readable medium and for converting the sensed laser light into an electrical signal.

A system for wirelessly streaming data can comprise an optically readable medium, comprising, a processor, a transceiver, coupled to the processor, configured for communicating with an external device, a memory, coupled to the processor, configured for storing a signal received from the transceiver, and an optical modulator, coupled to the processor, configured to receive instructions from the processor to create a directed light beam based on the signal stored in the memory; and an optical reader, comprising, a reading laser configured to emit laser light to the optically readable medium, and an opto-electronic device configured for sensing laser light reflected from the optically readable medium and for converting the sensed laser light into an electrical signal.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

What is claimed is:

1. An optically readable medium, comprising:
    (a) a processor;
    (b) a transceiver, coupled to the processor, configured for communicating with an external device;
    (c) a memory, coupled to the processor, configured for storing a signal received from the transceiver; and
    (d) an optical modulator, coupled to the processor, configured to receive instructions from the processor to create a modulated light beam, wherein the optical modulator is configured to create the modulated light beam in real time to simulate pits and lands on demand in response to the instructions received from the processor.

2. The optically readable medium of claim 1, further comprising a power supply.

3. The optically readable medium of claim 1, further comprising a charging device.

4. The optically readable medium of claim 3, wherein the charging device is a photo sensitive charging device.

5. The optically readable medium of claim 1, wherein the transceiver is configured to communicate via RF.

6. The optically readable medium of claim 1, wherein the transceiver is configured to automatically detect a presence of the external device in a receiving range of the transceiver.

7. The optically readable medium of claim 1, wherein the transceiver is configured to automatically detect wireless communication initiated by the external device.

8. The optically readable medium of claim 1, wherein the transceiver is configured to communicate with more than one external device.

9. The optically readable medium of claim 1, wherein the optical modulator comprises a light emitting diode.

10. A method for wirelessly streaming data to a non-transitory optical medium comprising:
    (a) receiving, by a transceiver embedded in the non-transitory optical medium, a wireless signal carrying digital data;
    (b) providing, by the transceiver, digital data extracted from the wireless signal to a processor embedded in the non-transitory optical medium;
    (c) providing, by the processor, instructions to create a modulated light beam in accordance with the digital data to an optical modulator embedded in the non-transitory optical medium; and (d) modulating, by the optical modulator, the light beam to emulate pits and lands.

11. The method of claim 10, further comprising automatically detecting a presence of an external device in a receiving range of the transceiver.

12. The method of claim 11, wherein the wireless signal carrying digital data is received from the external device.

13. The method of claim 10, further comprising automatically detecting a presence of more than one external device in a receiving range of the transceiver.

14. The method of claim 10, further comprising automatically detecting wireless communication initiated by the external device.

15. A system comprising:
   an optically readable medium, comprising,
      a processor,
      a transceiver, coupled to the processor, configured for communicating with an external device,
      a memory, coupled to the processor, configured for storing a signal received from the transceiver, and
      an optical modulator, coupled to the processor, configured to receive instructions from the processor to create a modulated light beam based on the signal stored in the memory; and
   an optical reader, comprising,
      a reading laser configured to emit laser light to the optically readable medium, and
      an opto-electronic device configured for sensing light reflected from the optically readable medium and for converting the sensed light into an electrical signal.

16. The system of claim 15, further comprising an electronic device configured to wirelessly transmit digital data to the transceiver.

17. The system of claim 16, wherein the electronic device is further configured to wirelessly receive digital data from the transceiver.

18. The system of claim 15, further comprising more than one electronic devices configured to wirelessly transmit digital data to the transceiver.

19. The system of claim 15, wherein the optical modulator comprises a light emitting diode.

* * * * *